United States Patent
Chuang et al.

(10) Patent No.: US 6,694,807 B2
(45) Date of Patent: Feb. 24, 2004

(54) WHEEL RIM HAVING A TIRE SENSOR FOR A PNEUMATIC TIRE

(75) Inventors: Marvin Chuang, Kaohsiung (TW); Wilson Yang, Kaohsiung (TW)

(73) Assignee: Lite-On Automotive Corporation, Kaoshiung (TW)

( * ) Notice: Subject to any disclaimer, the term of this patent is extended or adjusted under 35 U.S.C. 154(b) by 0 days.

(21) Appl. No.: 10/184,918

(22) Filed: Jul. 1, 2002

(65) Prior Publication Data

US 2003/0126918 A1 Jul. 10, 2003

(30) Foreign Application Priority Data

Jan. 9, 2002 (TW) .......................... 91100332 A

(51) Int. Cl.[7] .............................................. B60C 23/02
(52) U.S. Cl. ....................................................... 73/146.5
(58) Field of Search ................................ 73/146, 146.5, 73/146.2, 146.8; 340/442, 444, 445, 447; 200/61.25, 61.26, 61.22; 152/152.1

(56) References Cited

U.S. PATENT DOCUMENTS

| | | | |
|---|---|---|---|
| 4,048,614 A | | 9/1977 | Shumway |
| 4,409,586 A | * | 10/1983 | Hochstein ................... 340/448 |
| 5,663,496 A | * | 9/1997 | Handfield et al. .......... 73/146.5 |
| 5,844,131 A | | 12/1998 | Gabelmann et al. |
| 5,945,908 A | * | 8/1999 | Nowicki et al. ............ 340/447 |
| 6,016,102 A | * | 1/2000 | Fortune et al. ............. 340/442 |
| 6,055,855 A | | 5/2000 | Straub |

* cited by examiner

*Primary Examiner*—William Oen
(74) *Attorney, Agent, or Firm*—Lowe Hauptman Gilman & Berner LLP

(57) ABSTRACT

A wheel rim having a tire sensor for a pneumatic tire is disclosed. The wheel rim includes a rim portion having a valve rod, a base seat fixing on the rim portion at a location other than the location of the valve rod, and a sensor embedded in and attached to the base seat. The sensor is used for sensing the conditions of the pneumatic tire and transmitting the obtained signals by radio frequency.

13 Claims, 2 Drawing Sheets

WHEEL RIM HAVING A TIRE SENSOR FOR A PNEUMATIC TIRE

CROSS REFERENCE

This application claims priority from Taiwan Patent Application No. 91100332 filed Jan. 9, 2002.

FIELD OF THE INVENTION

The invention relates to a wheel rim having a tire sensor for a pneumatic tire, and more particularly, to a wheel rim having a tire sensor for a pneumatic tire that has a sensor firmly attached to the wheel rim and the sensor is easy to be changed or performed maintenance.

BACKGROUND OF THE INVENTION

There are many sensing apparatuses for monitoring tire pressure in the prior art for a pneumatic tire vehicle. For example, a U.S. Pat. No. 4,048,614 "Low Tire Pressure Warning Device" granted to Shumway et al. on Sep. 13, 1977 discloses a tire-pressure warning system that, being installed on the wheel rim, includes a wireless transmitter for actuating a power source, a switch, and a diaphragm. The warning system can trigger the wireless transmitter to provide driver with warning signal when the tire pressure is lower than a predetermined pressure value. But the above-mentioned warning apparatus can only provide warning signal when the vehicle has excessive low tire pressure. Besides, the constituted members of the warning apparatus is rather complicated, thereby, the warning apparatus is not applicable to the modern vehicles.

Another U.S. Pat. No. 5,844,131 "Tire Pressure Sensor Apparatus for a Pneumatic Tire Vehicle" granted to Gabelmann et al. on Dec. 1, 1998 discloses a tire pressure sensing apparatus. The sensing apparatus includes a housing having at least two base seat members for placing the apparatus on the wheel rim platform and adjustably supporting the housing to be fixed in place by acting together with a wheel valve rod.

Still another U.S. Pat. No. 6,055,855 "Tire Pressure Sensor Wheel Attachment Apparatus" granted to Straub et al. on May 2, 2000 discloses an apparatus for fixing on the wheel rim of a vehicle. The apparatus possesses a pressure sensor fixing on the wheel rim by threaded connection with a tire valve rod.

In addition, U.S. patent application Ser. No. 09/910,725 filed on Jul. 24, 2001 (corresponding to Taiwan (R.O.C.) Patent application number 089,117,039 entitled "A Method and an Apparatus for Monitoring Pneumatic Tire Pressure") discloses a sensor module, attached to a pneumatic tire, for sensing the tire pressure and transmitting the signals obtained from the tire pressure by wireless frequency. Moreover, U.S. patent application Ser. No. 09/941,567 filed on Aug. 30, 2001 (corresponding to Taiwan (R.O.C.) Patent application number 089,118,096 entitled "Tire Condition Sensor of Pneumatic Tire of a Vehicle") discloses a tire pressure sensor attached to a pneumatic tire. These two applications are incorporated herein by reference in their entirety.

The aforementioned prior arts generally make use of a valve rod of the tire to attach the tire-condition sensor on the wheel rim platform. But it goes without saying that the balance of the tire will be affected as the sensor is attached to the side of the valve rod. Moreover, the aforementioned sensors may become loose and then drop while it is operating since the sensor is fixed by threaded member, thereby, the sensor may become malfunction.

To resolve the above-mentioned problems, it becomes necessary to provide a wheel rim having the sensor firmly attached in order that the tire condition can be monitored constantly.

SUMMARY OF THE INVENTION

In the light of the above-mentioned disadvantages, an objective of the invention is to provide a wheel rim having a sensor firmly attached thereon, and interacted with a receiver so as to monitor the service condition of the tire.

Another objective of the invention is to provide a wheel rim having a sensor firmly attached thereon, and is apt to be assembled or disassembled.

To attain the above-mentioned objectives, the wheel rim includes a rim portion having a valve rod, a base seat fixing on the rim portion at a location other than the location of the valve rod, and a sensor embedded in and attached to the base seat. The sensor is used for sensing the conditions of the pneumatic tire and transmitting the obtained signals by radio frequency.

In one aspect of the invention, the base seat of the wheel rim of the sensor has two fastening hooks for fastening the sensor. In addition, the base seat has also two flaps for disassembling the sensor.

In other aspect of the invention, the wheel rim has an upper lid portion for acting together with the base seat so as to firmly fix the sensor. Further, the upper lid portion has also a concave portion that can press the sensor downward to further tightening the sensor while the upper lid portion acts together with the base seat, thereby, can firmly fix the sensor in place.

To sum up, since the rim portion of the invention has a sensing apparatus that can transmit the signal obtained from sensing the condition of the tire of a vehicle by radio frequency to the driver. In this way, the driver can be informed of the condition of the tire to avoid any emergency that might occurs. Moreover, since the sensor is firmly attached to the wheel rim at a location opposite to the valve rod, there is no feeling of concern over the dropping of the sensor, and the sensor can also improve the balancing of the tire. Besides, the sensor can be disassembled easily from the wheel rim for changing new one or performing maintenance.

In order to make the foregoing and other objectives, characteristics, and advantages of the invention more significant and easy to be understood, preferred embodiments with accompanied figures will be illustrated as follows:

DETAILED DESCRIPTION OF THE EMBODIMENTS

Figure 1:
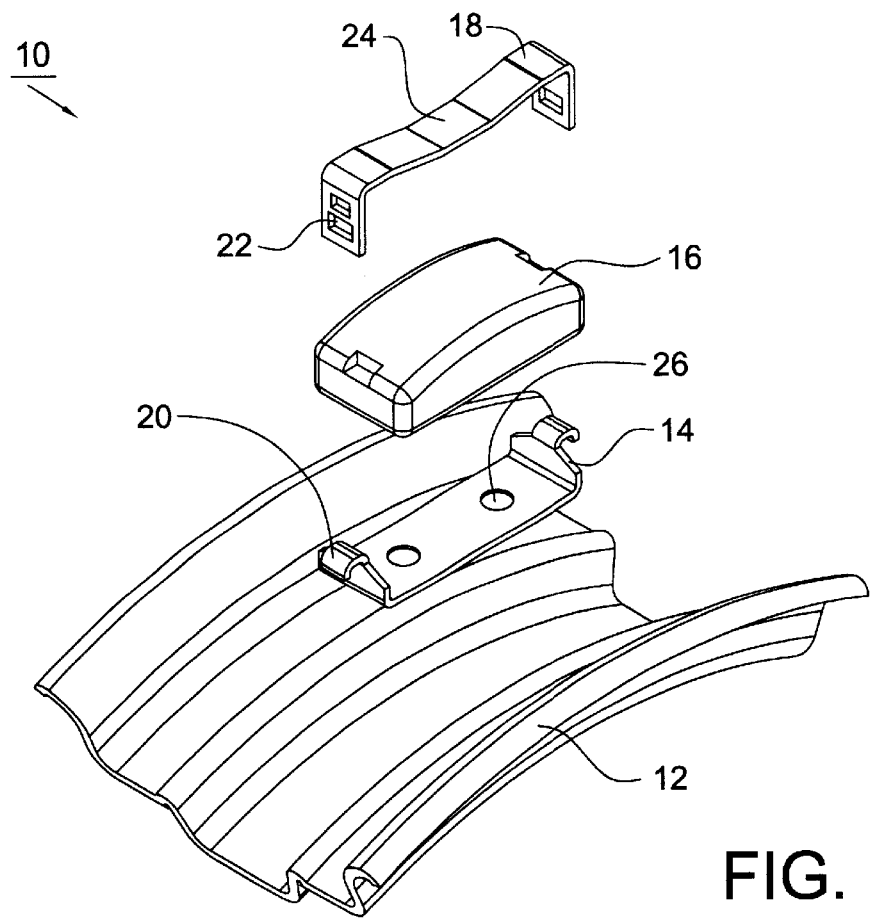
FIG. 1 is an exploded view of a wheel rim having tire-condition sensor of the first embodiment of the invention.
Figure 2:
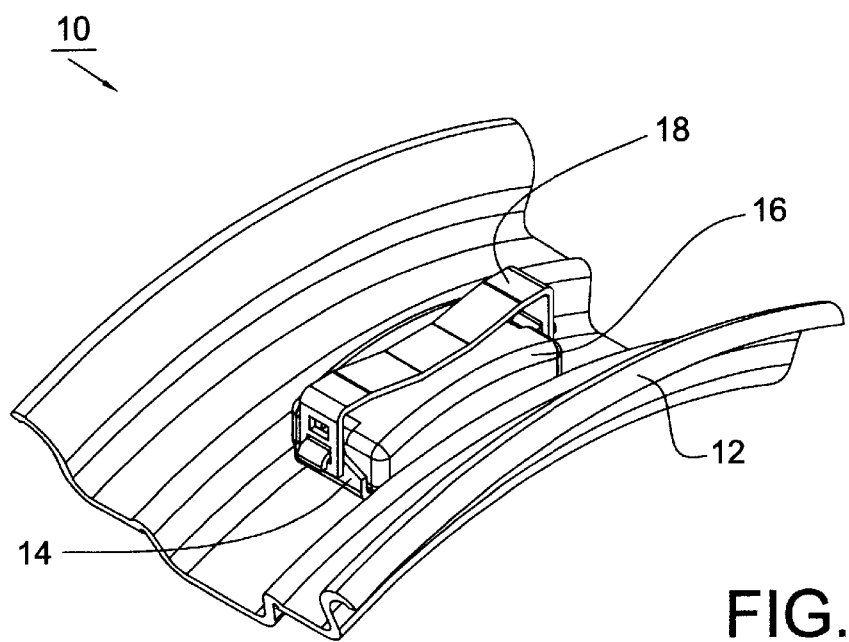
FIG. 2 is an isometric view of a wheel rim having tire-condition sensor of FIG. 1.

FIG. 1 and FIG. 2 show a wheel rim 10 having tire-condition sensor of the first embodiment of the invention. As shown in FIG. 1 and FIG. 2, a wheel rim 10 having a tire-condition sensor 16 is used for mounting a rubber tire to form a pneumatic tire of a vehicle. The wheel rim 10, having the tire-condition sensor attached, includes a rim portion 12, a base seat 14, a sensor 16, and an upper lid portion 18.

The base seat 14 can be fixed to the rim portion 12 by any type of connection such as welding, spot weld, rivet connection, threaded connection etc., for example, the base seat 14 is fixed to the rim portion 12 by spot weld through two connecting spots 26. The location of the base seat 14 aligns with the valve rod (not shown) in order to keep the wheel rim in balance.

A sensor 16 is set on the base seat 14 and is fixed by the upper lid portion 18. Moreover, the dimension of the sensor 16 matches that of the base seat 14 such that the sensor 16 can be tightly embedded into the base seat 14. The base seat 14, having two fastening hooks 20, can fasten the upper lid portion 18 through the combined action together with the openings 22 of the upper lid portion 18. Preferably, a concave portion 24 made of elastic material such as leaf spring is provided such that the sensor 16 is fixed steadily through the tight pressing of the upper lid portion on the sensor 16. Further, when it comes to disassembling the sensor 16, the upper lid portion 18 can be pressed down further to separate it from the fastening hooks 20 through the openings 22.

Persons familiar with the art can understand that the base seat 14 can also be formed integrally with the wheel rim. In other word, the wheel rim 12 itself has a concave portion for embedding the sensor 16 therein. The wheel rim 12, having two fastening hooks 20, can hold the sensor 16 in place through the combined action together with the upper lid portion 18. An alternative way is to have the upper lid 18 fasten directly on the wheel rim 12 without any concave portions thereof.

The sensor 16, including a Sensor Application-Specific Integrated Circuit (AISC) and a radio-frequency (RF) transmitter, can sense the value of the condition of the pneumatic tire such as the pressure, temperature, and acceleration etc., and then transmit the signals obtained from the sensing by RF. The sensor 16 is described in U.S. application Ser. No. 09/910,725 corresponding to Taiwan (R.O.C.) Patent application No. 089,117,036 entitled "A Method and an Apparatus for Monitoring Pneumatic Tire Pressure".

The configuration of the sensor 16 in FIG. 1 is provided only for an example to facilitate the illustration of the invention and is not for limiting the application of the invention. Persons familiar with the art can understand that the sensor 16 can be of any configurations. Moreover, when the configuration of the sensor 16 is the one other than the embodiments shown in the invention, the base seat 14 and the upper lid portion 18 can have their corresponding configurations to match those of the sensors 16.

Figure 3:
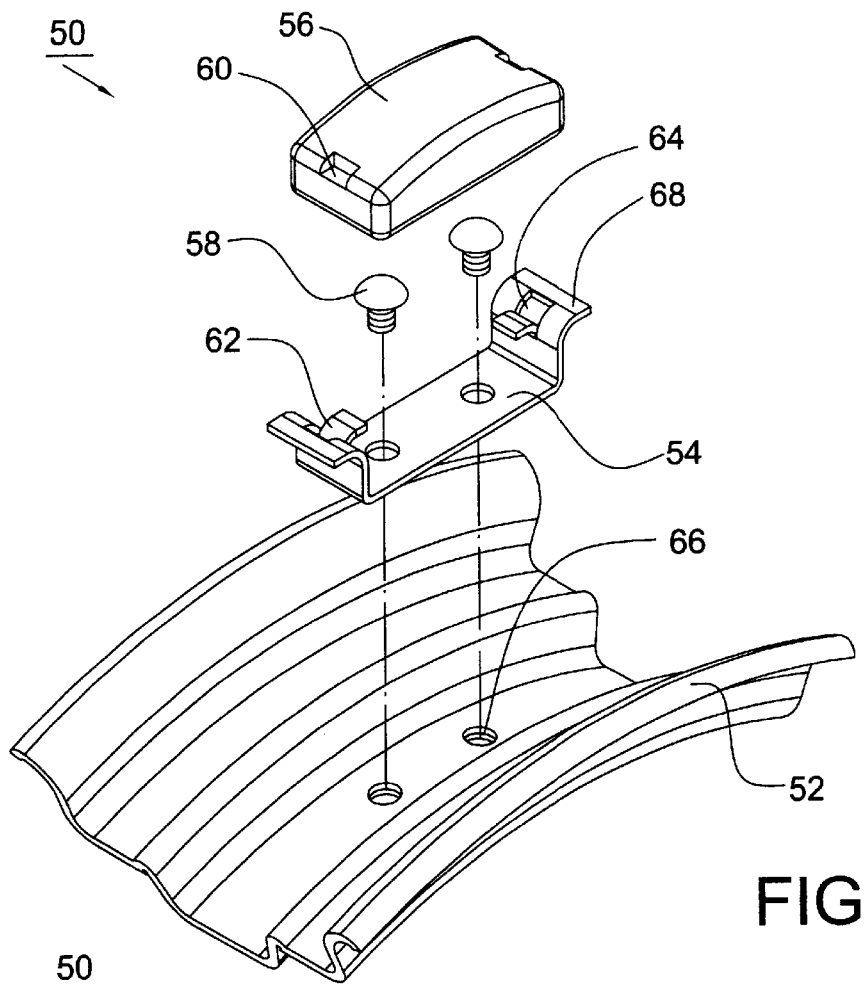
FIG. 3 is an exploded view of a wheel rim having tire-condition sensor of the second embodiment of the invention.
Figure 4:
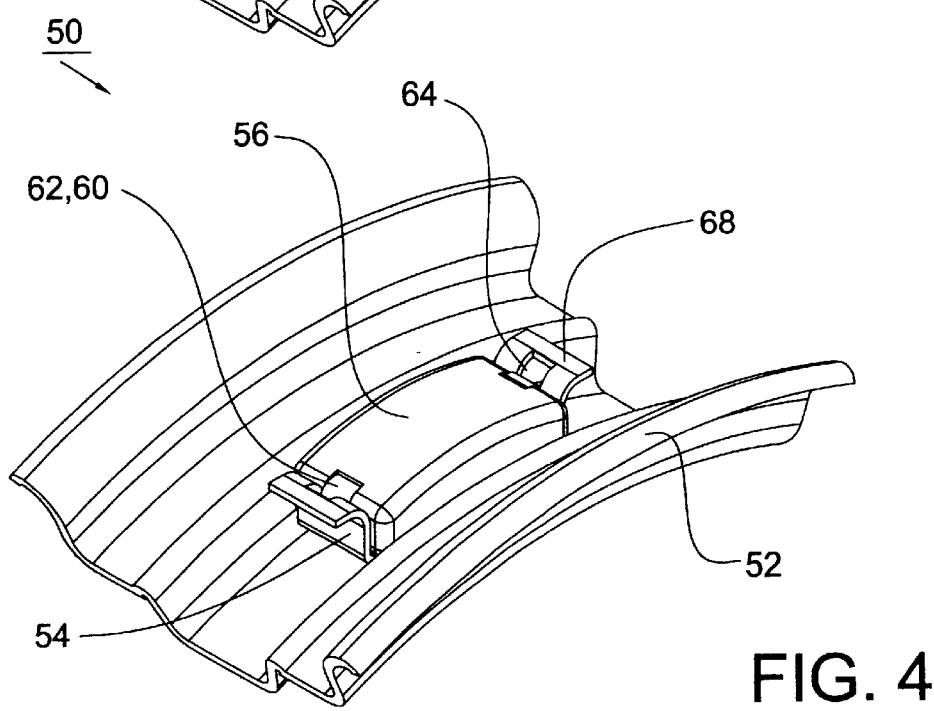
FIG. 4 is an isometric view of a wheel rim having tire-condition sensor of FIG. 3.

FIG. 3 is an exploded view of a wheel rim having tire-condition sensor of the second embodiment of the invention while FIG. 4 is an isometric view of a wheel rim having tire-condition sensor of FIG. 3. As shown in FIG. 3 and FIG. 4, a wheel rim 50 having a tire-condition sensor 56 is similar to the wheel rim 10 shown in FIG. 1 and FIG. 2 wherein similar elements contained thereof are denoted by similar numbers. The wheel rim 50, having a tire-condition sensor 56, includes a rim portion 52, a base seat 54, and the sensor 56.

The base seat 54 is attached to the rim portion 52 by two bolts 58 through the threaded holes 66 provided on the rim portion 52. The dimension of the sensor 56 is close to that of the base seat 54. The base seat 54 has two fastening hooks 62 for fastening the sensor 56 by hooking to the indentations 60 provided at the ends of the sensor 56. Preferably, the base seat 54 possesses two flaps 68 each having an opening 64. Therefor, when it comes to disassembling the sensor 56, a pry bar (not shown) can be used to insert into the openings 64 to pry open the base seat 54 in order to take out the sensor 56.

Persons versed in the art can understand that the rim portion can be either a wheel rim of a motorcycle or a wheel rim of a vehicle. Moreover, the wheel rim can be made of steel or aluminum.

According to the foregoing statements, the tire-condition sensing apparatus (sensor) attached on the rim portion can sense the conditions of the pneumatic tire and transmit their signals into the vehicle to let the driver know the conditions of the pneumatic tire of the vehicle, thereby can prevent the emergency situation from occurring. Further, since the sensor is firmly attached to the wheel rim opposite to the valve rod, there is no feeling of concern over the dropping of the sensor, and the sensor can also improve the balancing of the tire. Besides, the sensor can be disassembled easily from the wheel rim for changing new one or performing maintenance.

Although the invention has been explained in relation to its preferred embodiment, it is to be understood that many other possible variations can be made without departing from the spirit and scope of the invention as hereinafter claimed.

What is claimed is:

1. A wheel rim having a tire sensor for a pneumatic tire, said wheel rim comprising:
   a rim portion having a valve rod;
   a base seat fixed on the rim portion at a location other than the location of the valve rod, said base seat being fixed to said rim portion by one selected from the group consisting of welding, spot welding, rivet connection and threaded connection; and
   a sensor embedded in and attached to the base seat for sensing conditions of the pneumatic tire and transmitting signals representing the sensed conditions by radio frequency;
   wherein the dimension of the sensor matches that of the base seat such that the sensor can be tightly embedded into the base seat, and the base seat comprises at least two fastening hooks for fastening the sensor.

2. The wheel rim having a tire sensor for a pneumatic tire of claim 1, wherein the base seat is in opposite position of the valve rod.

3. The wheel rim having a tire sensor for a pneumatic tire of claim 1, wherein the base seat further comprises two flaps for disassembling the sensors.

4. The wheel rim having a tire sensor for a pneumatic tire of claim 1, further comprising an upper lid portion cooperating with the base seat to firmly fasten the sensor therebetween.

5. The wheel rim having a tire sensor for a pneumatic tire of claim 4, wherein the upper lid portion has a concave portion tightly pressing the sensor toward the base seat when the upper lid portion cooperates with the base seat to fasten said sensor.

6. A wheel rim, comprising a tire sensor for a pneumatic tire, said wheel rim further comprising:
   a rim portion having a location adapted to receive a valve rod; and
   a base seat positioned on the rim portion at a location other than said location of the valve rod, said base seat including a bottom and two opposing walls spaced from each other and extending upward from said bottom;

wherein said sensor is fastened between said walls of the base seat and adapted to detect conditions of the pneumatic tire and transmit signals representing the detected conditions by radio frequency.

7. The wheel rim of claim 6, wherein said walls are flexible away from each other, a distance between said walls matches a dimension of said sensor, and said sensor is press-fit between said walls.

8. The wheel rim of claim 6, further comprising an upper lid releasably engaging said walls, wherein said lid, said walls and said bottom together define a unsealed space tightly containing the sensor therein.

9. The wheel rim of claim 8, wherein each of the walls of said base seat includes a hook projecting away from the other of said walls;

said upper lid includes a top and two opposing walls spaced from each other and extending downward from said top, each of the walls of the upper lid including at least one aperture engaging the hook of one of the walls of the base seat so as to fasten the upper lid to the base seat.

10. The wheel rim of claim 9, wherein said top is made of elastic material and includes a downwardly curved portion that resiliently presses the sensor toward said bottom and allows the apertures to release the respective hooks when said top is pressed toward the bottom.

11. The wheel rim of claim 7, wherein each of said walls includes a fastening projection projecting towards the other of said walls, said projections engaging an upper portion of said sensor and firmly holding said sensor against said bottom.

12. The wheel rim of claim 11, wherein an upper portion of each of said walls is bent away from the other of said walls, each of said bent upper portions having an opening adapted to receive a tool used to remove the sensor from said base seat.

13. The wheel rim of claim 12 wherein, for each of said walls, the hook is a part of the upper portion of said wall, said part being partially cut from a remainder of said upper portion and bent toward the other of said walls to form both said hook and said opening.

* * * * *